No. 841,188. PATENTED JAN. 15, 1907.
A. SCHMID.
DEVICE FOR DETECTING SUBTERRANEAN WATERS.
APPLICATION FILED OCT. 14, 1904.
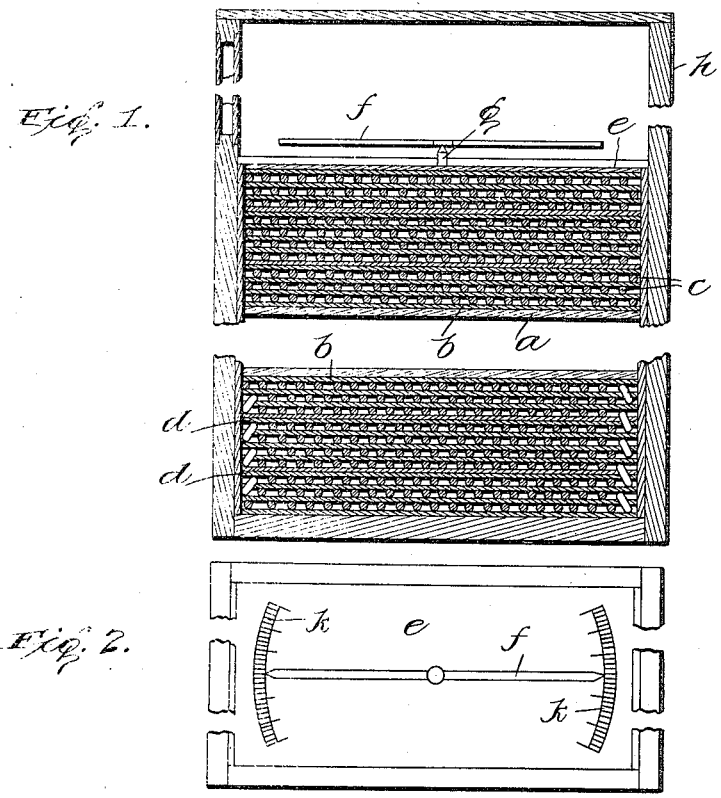
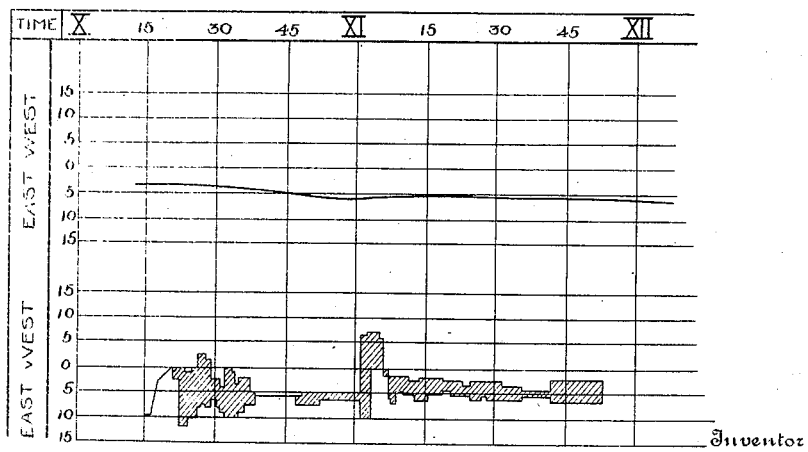

UNITED STATES PATENT OFFICE.

ADOLF SCHMID, OF BERNE, SWITZERLAND.

DEVICE FOR DETECTING SUBTERRANEAN WATERS.

No. 841,188.     Specification of Letters Patent.     Patented Jan. 15, 1907.

Application filed October 14, 1904. Serial No. 228,445.

*To all whom it may concern:*

Be it known that I, ADOLF SCHMID, of Berne, in the canton of Bern and Republic of Switzerland, a citizen of said Republic, have invented a new and useful Improvement in Devices for Indicating Atmospheric Variations and Detecting the Source and Direction of Subterranean Waters, of which the following is a specification, reference being had to the accompanying drawings.

The object of my invention is an apparatus which shall indicate certain atmospheric changes, the nature and cause of which are not yet understood, but which manifest themselves in a peculiar way in the neighborhood of the source and course of subterranean waters by rapid oscillations of the pointer of my new device, the amplitude of these oscillations being as great as fifty degrees, (50°.) From this it follows that my device is particularly adapted to the detection of the source of subterranean waters and their courses.

My invention relates to improvements in registering devices which indicate changes in atmospheric conditions taking place in the vicinity of the rise and flow of subterranean waters.

My invention consists in the device and combinations hereinafter described and claimed.

In the drawings illustrating the principle of my invention and the best mode now known to me of applying that principle, Figure 1 represents my new device in central vertical sectional view. Fig. 2 represents the same in plan view, and Fig. 3 is a graphical representation of the results of tests made with my new device.

A hollow glass cylinder $a$, the axis of which is horizontal, is covered by a sheet $b$ of paraffined paper, and around this sheet of paper is spirally wound a soft-iron wire that is well annealed, the different turns of the wire not contacting with one another, and the several layers $c$ thereof being separated from one another by layers of paraffined paper. At intervals the paraffined-paper envelop separating two consecutive layers of iron wire contains a sheet of tin-foil $d$. The outside layer or winding of the spool of iron wire thus formed is covered with paper. The winding of this spool, which is preferably insulated, is in electrical connection with no source of electrical energy and forms a circuit which is constantly open. The spool is covered with a glass dial-plate $e$, having at its center a pivot $g$, upon which is mounted free to oscillate a pointer or needle $f$, that is feebly magnetized. By "feebly magnetized" is here meant that the magnetization is precisely sufficient to enable the needle under the action of the terrestrial magnetic couple to overcome the friction upon its pivot and to place itself in the magnetic meridian when it is subjected to the influence of no other force and to leave this position of rest (the magnetic meridian) under the influence of the winding of the spool when the latter is brought under the influence of the atmospheric phenomena above referred to. Upon the dial-plate $e$ is marked off a graduated scale $k$, the zero of which lies in the vertical plane passing through the axis of the spool, the graduations reading on both sides of this plane. The spool and the needle $f$ are shielded from displacement by air-currents by a casing $h$, closed at the top by a glass window and having in one of its side faces and above the spool an aperture closed by a double window $i$, adapted to permit the entrance of light to illuminate the needle and scale, and thereby facilitate the reading of the exact position of the needle.

The device is used in the following manner: Let it be supposed that at a certain point one suspects the existence of a source or stream of subterranean water. At this point is placed, upon a tripod preferably, my new device in such manner that the needle may oscillate in a horizontal plane and that the axis of the spool lies in the plane of the magnetic meridian, which plane one can readily determine by the aid of the ordinary compass. The feebly-magnetized needle of the device will come to rest at one of the divisions of the scale $k$, generally other than the zero division, and if a source or a stream of subterranean water is in the vicinity the needle will after a time oscillate rapidly, the amplitude of the vibrations being from two degrees to ten degrees, but in some cases reaching fifty degrees.

In Fig. 3 are shown in the upper part thereof graphically the slow variations in the position of the needle between five degrees and six degrees east from eight minutes after ten o'clock in the morning until fifteen minutes after noon during an experiment in which the device was located upon the summit of a mountain almost free from any source of subterranean waters.

In the lower part of Fig. 3 is shown graphically the behavior of the needle of the device when the latter was placed in the neighborhood of a source of subterranean waters. A series of hatched rectangles, some of which are in juxtaposition, while others are separated from one another, shows by their relative horizontal position at what time the needle vibrated rapidly, and the height of the several rectangles indicates the amplitude of the several vibrations occurring at the times noted by the horizontal line. Some complete vibrations were made in the space of one minute and even of only a few seconds, so that in the same minute several successive oscillations took place. The lines between the rectangles show the periods of rest or of slow displacement of the needle before or after a period of rapid vibrations. From this figure it will be seen that the second experiment began at fifteen minutes after ten o'clock in the morning and lasted until within five minutes of noon and that the needle made vibrations which in amplitude varied between seven degrees west and twelve degrees east. On the other hand, in the first experiment, when the device was placed on the top of a mountain almost free from sources of subterranean waters the movements of the needle were almost insignificant.

Good results have been obtained with an apparatus made up of a spool comprising five thousand turns of annealed iron wire of 0.3 millimeter diameter and having a length of one hundred and thirty millimeters and an exterior diameter of one hundred and fifteen millimeters and a very light needle of approximately circular section and having a length of one hundred and thirty millimeters.

Instead of iron wire, wire of any other magnetizable metal may be employed.

In the construction of my new device the needle must be shielded from all displacement due to air-currents. It is recommended that the casing be made of thick planks or boards, which are poor conductors of heat, and to close the top of the casing with a double window, between the parts of which is a layer of air. This construction prevents displacements in the interior of the casing due to currents of air resulting from differences in temperature, and so avoids accidental movement of the needle proceeding therefrom.

To obtain accurate readings, it is also necessary in the use of the apparatus to protect it from the rays of the sun by an awning.

What I claim is—

1. In a device of the class described the combination of a spool made up of a winding of magnetizable metal wire, the turns of which are separated electrically one from the other, the circuit of said winding being electrically open at all times; with a feebly-magnetized needle rotatably mounted in the proximity of said spool.

2. In a device of the class described, the combination of a spool made up of a winding of annealed iron wire, the turns of which are separated electrically one from the other, the circuit of said winding being electrically open at all times; with a feebly-magnetized needle rotatably mounted in the proximity of said spool.

3. In a device of the class described, the combination of a spool made up of a winding of magnetizable metal wire, the turns of which are out of contact with one another, and the several layers of which are separated by paraffined paper; said paraffined paper; a hollow glass cylinder within said spool; and a feebly-magnetized needle rotatably mounted.

4. In a device of the class described, the combination of a casing one face of which bears a graduated scale; a spool within said casing, said spool being made up of a winding of magnetizable metal wire, the electrical circuit of which is open at all times; and a rotatable feebly-magnetized needle.

5. In a device of the class described, the combination of a casing one face of which bears a graduated scale; a spool within said casing, said spool having a winding of magnetizable metal wire, the electrical circuit of which is open at all times; a glass cylinder within said winding; and a feebly-magnetic needle rotatably mounted.

6. In a device of the class described, the combination of a spool the winding of which is of magnetizable iron wire, the turns of which are out of electrical contact with one another and the layers of which are separated by paraffined paper and tin-foil, said winding being constantly on open circuit; said paper and tin-foil; and a feebly-magnetic needle rotatably mounted.

7. In a device of the class described, the combination of a glass cylinder; a winding of magnetizable iron wire thereon, the turns of which are out of contact with one another and the several layers of which are separated from one another and from said glass cylinder by paraffined paper; said paper; and a feebly-magnetic needle rotatably mounted; said winding being constantly on open electrical circuit.

8. In a device of the class described, the combination of a casing; a winding therein of magnetizable metal wire the turns of which are out of electrical contact with one another, and the electrical circuit through which is constantly open; and a magnetic needle rotatably mounted.

ADOLF SCHMID.

Witnesses:
ADOLF FEDERER,
FRIEDRICH NAEGELI.